United States Patent [19]

Kowal et al.

[11] Patent Number: 4,685,706
[45] Date of Patent: * Aug. 11, 1987

[54] RELEASABLE PUSH-TO-CONNECT TUBE FITTING

[75] Inventors: Leonard J. Kowal, Prospect Heights; Albert J. Schwarz, Lincolnwood; Norman B. Wells, Skokie, all of Ill.

[73] Assignee: Clevite Industries Inc., Glenview, Ill.

[*] Notice: The portion of the term of this patent subsequent to Nov. 11, 2003 has been disclaimed.

[21] Appl. No.: 815,332

[22] Filed: Dec. 31, 1985

Related U.S. Application Data

[63] Continuation-in-part of Ser. No. 708,164, Mar. 4, 1985, Pat. No. 4,621,842.

[51] Int. Cl.$^4$ ............................................. F16L 21/06
[52] U.S. Cl. ..................................... 285/322; 285/382
[58] Field of Search ............... 285/322, 323, 321, 308, 285/177, 1 L, 158, 382

[56] References Cited

U.S. PATENT DOCUMENTS

| | | | |
|---|---|---|---|
| 1,683,416 | 9/1928 | Selah | 285/382.7 X |
| 2,182,797 | 12/1939 | Dillon | 285/308 |
| 2,389,233 | 11/1945 | Cowles | 285/382.7 X |
| 3,653,689 | 4/1972 | Sapy et al. | 285/322 X |
| 3,817,561 | 6/1974 | Kay | 285/177 |
| 3,999,783 | 12/1976 | Legris | 285/323 X |
| 4,302,036 | 11/1981 | Burge | 285/323 |
| 4,560,189 | 12/1985 | Lang et al. | 285/158 |
| 4,621,842 | 11/1986 | Kowal et al. | 285/322 |

FOREIGN PATENT DOCUMENTS

| | | | |
|---|---|---|---|
| 379413 | 9/1932 | United Kingdom | 285/323 |
| 1527018 | 10/1978 | United Kingdom | 285/321 |

*Primary Examiner*—Dave W. Arola
*Attorney, Agent, or Firm*—Russell E. Baumann

[57] ABSTRACT

A releasable push-to-connect tube fitting wherein a collet receiving the tube end is provided with longitudinally extending inner slots sized so as to limit constriction of the collet to maintain the outer diameter of the inner end of the collet greater than the minimum diameter of a confronting camming surface of a fitting body member for effectively positively retaining the collet in the body member upon assembly of the fitting elements. The collet includes an enlarged outer end exposed exteriorly of the fitting body for use in releasing the tube from the fitting when desired. The collet is retained in the body by constrictive deformation of the body outer end portion after installation of the collet therein. The constrictive deformation is effected by a suitable tool. In one embodiment, the fitting body is adapted to be secured in a port element. An eyelet may be provided for reception within the tube end to be connected to the fitting. The collet may be selectively provided with a plurality of tube biting teeth or a helical tooth.

17 Claims, 11 Drawing Figures

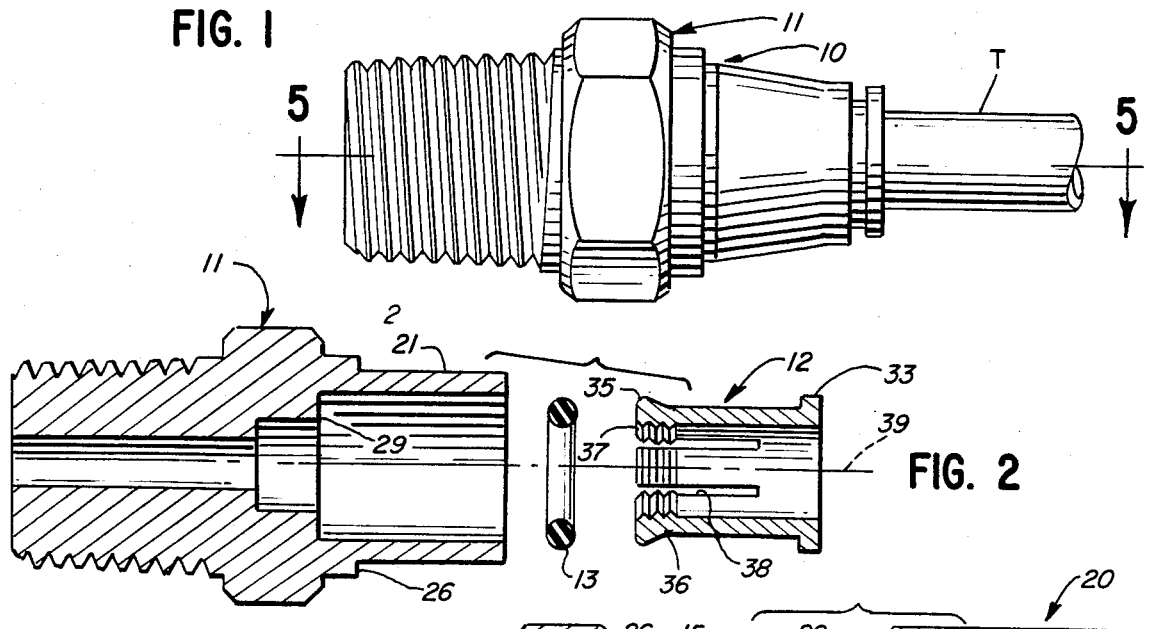
FIG. 1
FIG. 2
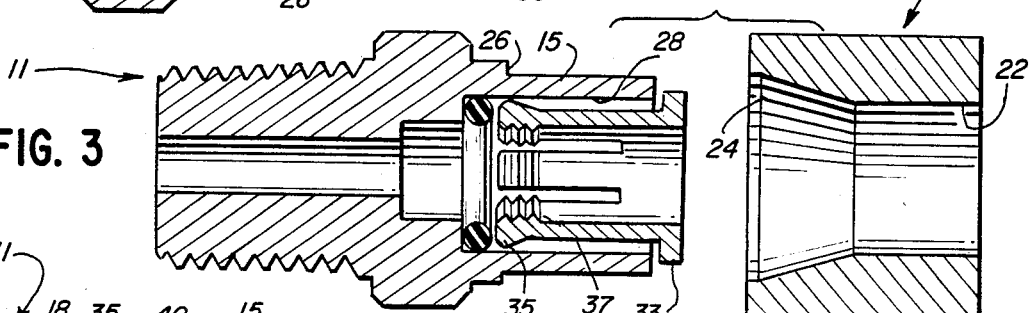
FIG. 3
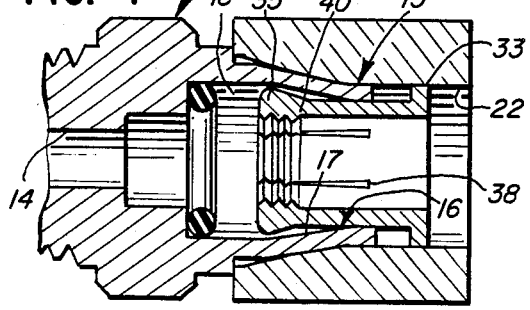
FIG. 4
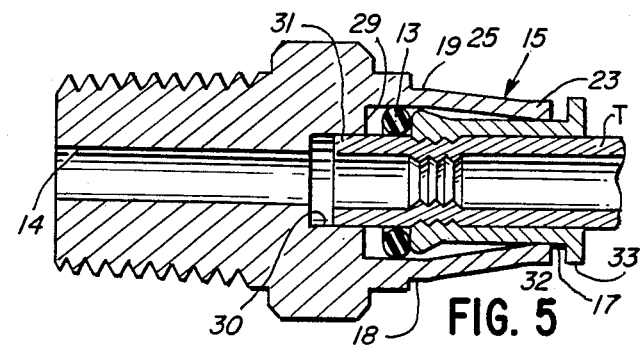
FIG. 5
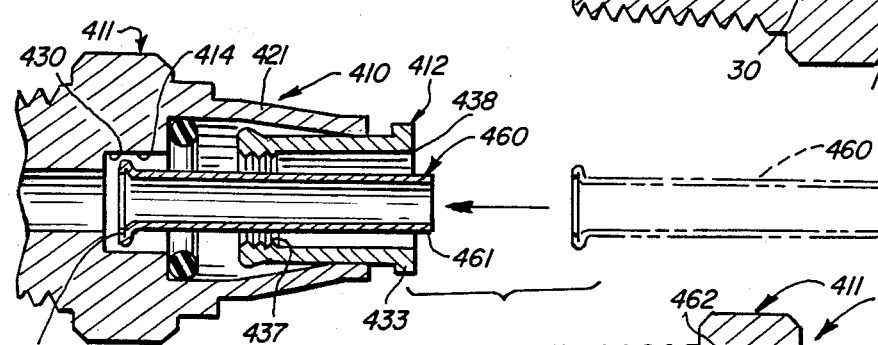
FIG. 10
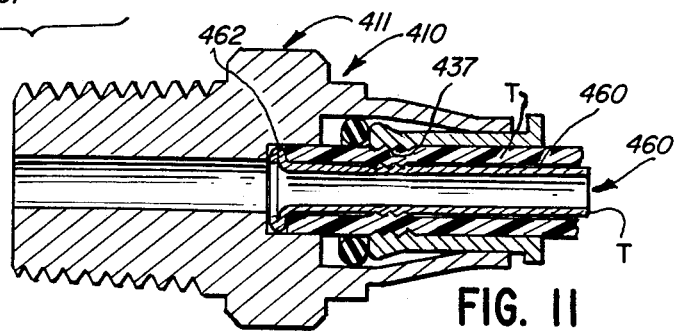
FIG. 11

RELEASABLE PUSH-TO-CONNECT TUBE FITTING

BACKGROUND OF THE INVENTION

Cross Reference to Related Application

This application comprises a continuation-in-part of our copending application Ser. No. 708,164, filed Mar. 4, 1985, entitled "Releasable Push-To-Connect Tube Fitting" now U.S. Pat. No. 4,621,842 issued Nov. 11, 1986.

FIELD OF THE INVENTION

This invention relates to tube fittings and in particular to releasable push-to-connect tube fittings.

DESCRIPTION OF THE BACKGROUND ART

In one form of releasable push-to-connect tube fitting, a collet is received within an end portion of the fitting body. The tube end is coaxially inserted through the collet for effecting a sealed connection of the tube end to the fitting body.

A number of different fittings have been developed for effecting such a tube connection. Illustratively, in U.S. Pat. No. 3,909,046 of Andre Legris, a tube fitting is shown wherein a tubular collet is firstly installed in a tubular member having at its axially inner end a tapered camming surface. The collet is installed from the inner end of the tubular member and, thus, the outer end of the collet must be no bigger than the minimum diameter of the bore of the tubular member. Resultingly, as shown in the Legris patent, it is difficult to release the tube from the fitting as such release requires the forceful urging of the collet axially inwardly as by a screwdriver acting on the relatively small distal end of the collet projecting from the fitting. In addition, the tubular member must be fixedly secured in the fitting body, thereby increasing the cost of the fitting and further providing a potential area of failure of the fitting should the tubular member not remain fixedly secured in the body.

Another collet-type tube coupling is illustrated in U.S. Pat. No. 4,178,023 of John D. Guest. As shown therein, the collet is provided with slots, permitting the inner end of the collet to be sufficiently compressed so as to permit it to pass axially inwardly through the small end of a tapered bore of the fitting body. This permits the collet to be assembled from outside the fitting body and permits the outer end of the collet to have a relatively large turned flange so as to permit facilitated axially inward movement of the collet in releasing the tube end from the fitting when desired. This design, however, has the serious disadvantage of potentially permitting the outward movement of the collet when the fitting is subjected to substantial fluid pressures as it is the resiliency of the slotted end of the collet which is retaining the collet in the fitting. The change of such failure is further increased where the tubing is of relatively soft material, such as synthetic resins, which offer relatively small resistance to radial inward constriction of the slotted collet end.

SUMMARY OF THE INVENTION

The present invention comprehends an improved releasable push-to-connect tube fitting eliminating the problems of the above discussed prior art devices in a novel and simple manner.

More specifically, the invention comprehends an improved fitting wherein the collet is provided with longitudinal slots at the inner end, but wherein the constrictibility of the slotted end is limited so as to prevent constriction to less than the minimum diameter of the collet bore, thereby effectively positively retaining the collet in the bore against blowout as from high pressure and the like in the fitting.

The invention further comprehends the provision of such a fitting wherein the collet is provided with a relatively large outer end for facilitated inward urging of the collet to release the tube from the fitting when desired.

The invention comprehends the provision of such a fitting wherein the body member defines an outer end portion which is constricted about the collet subsequent to the insertion of the collet coaxially thereinto, thereby effectively retaining the collet within the body end.

The invention comprehends that the body end be formed of a material having a rigidity substantially greater than the rigidity of the constrictible collet inner end, whereby the collet is effectively positively retained in the body end against blowout and the like.

In the illustrated embodiment, the body end is constricted as by swaging thereof subsequent to the installation of the collet therein.

The body end defines a frustoconical camming surface engaging the inner end of the collet for effecting constriction thereof tightly about the tube end inserted therethrough in effecting the desired sealed connection of the tube end to the body.

The collet may be provided with an inwardly projecting gripping portion at the inner end thereof for effectively positively engaging the tube end in the made-up arrangement of the fitting for further improved retention of the tube end in sealed connection to the body.

In the illustrated embodiment, the outer end of the collet is defined by a radially outturned flange. The flange has a maximum outer diameter no greater than the minimum outer diameter of the body end portion, but substantially greater than the inner diameter of the body end portion so as to provide for facilitated manipulation of the collet from externally of the body.

The fitting of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a fitting embodying the invention showing a portion of a tube end connected thereto;

FIG. 2 is an exploded diametric section of the fitting;

FIG. 3 is a diametric section illustrating a first step in the forming of the body end portion to retain the collet in association therewith;

FIG. 4 is a diametric section illustrating a final step in the constriction of the body end portion;

FIG. 5 is a diametric section illustrating the arrangement of the made-up fitting with the tube end connected thereto;

FIG. 10 is a fragmentary diametric section illustrating the installation of a tubular eyelet into the fitting; and FIG. 11 is a diametric section illustrating the made-up arrangement of the fitting, with a tube end connected thereto.

DESCRIPTION OF THE PREFERRED EMBODIMENT

Figure 6:
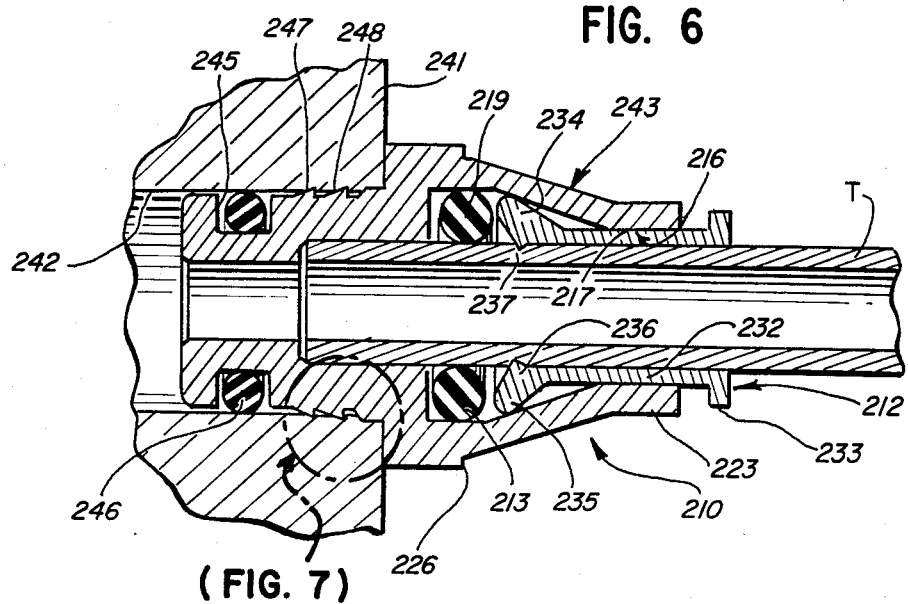
FIG. 6 is a diametric section illustrating the made-up arrangement of a modified form of fitting embodying the invention.

In the exemplary embodiment of the invention as disclosed in FIGS. 1-5 of the drawing, a tube fitting generally designated 10 is shown to comprise a body 11, a collet 12, and a seal 13.

The body is provided with a through bore 14. The body defines an axially outer end 15 in turn defining a radially inner surface 16. Surface 16 defines the axially outer end of the through bore 14, and includes an axially outer, first cylindrical portion 17, an axially inwardly widening frustoconical, axially inner portion 18, and an axially inner cylindrical portion 19.

In the illustrated fitting, the outer end 15 of body 11 is formed by suitable means, such as swaging element 20. Thus, as seen in FIG. 2, body 11 is originally provided with a right circularly cylindrical tubular end 21 defining the outer end of bore 14. Swaging tool 20 is engaged with the tubular body end 21, as illustrated in FIGS. 3 and 4, so as to deform the tubular end 21 so as to define the desired stepped configuration of the fitting outer end portion 15 illustrated in FIGS. 1, 4, and 5.

More specifically, the inner swaging surface of the tool 20 is defined by an outer right circularly cylindrical surface portion 22 having a diameter equal to the desired outer diameter of the outer end 23 of the body portion 15. The tool further defines a frustoconical inner surface 24 arranged to form the frustoconical midportion 25 of the body outer end 15 at an included angle in the range of approximately 20° to 24°.

As further seen in FIGS. 3 and 4, body 11 defines a radial shoulder surface 26 disposed to be abutted by the axially inner end 27 of the tool 20 at the end of the forming operation. The cylindrical inner surface 28 of the undeformed body end 21 extends axially inwardly of the plane of surface 26. Thus, the cylindrical inner portion 19 of the surface 16, as seen in FIG. 4, is unconstricted and remains at the diameter of the inner surface prior to deformation of the body end by the tool 20.

As seen in FIG. 5, the seal 13 comprises an O-ring which is disposed within the surface portion 19 and in abutment with a radial shoulder surface 29 at the axially inner end of the surface 19.

As further illustrated in FIG. 5, the body bore 14 includes a radially enlarged cylindrical midportion 30 having a diameter substantially equal to the outer diameter of the tube T to be connected to the fitting, permitting the distal end 31 of the tube to be received therein in the made-up condition of the fitting, as shown in FIG. 5. In the made-up condition, O-ring 13 is radially compressed between the tube end and surface 19 so as to provide a seal of the tube end to the body 11.

As best seen in FIG. 2, collet 12 is defined by a tubular midportion 32, an axially outer, radially enlarged end 33, and an axially inwardly, radially inwardly and outwardly enlared end 34. The inner diameter of portions 32 and 33 is substantially equal to the outer diameter of the tube T to be connected, as illustrated in FIG. 5.

Outer end 33, in the illustrated embodiment, is defined by an outturned flange having an outer diameter which is no greater than the diameter of tool surface portion 22, as illustrated in FIG. 4.

Inner end 34 of the collet is defined by a radially outwardly projecting boss 35 and tooth means comprising a plurality of radially inwardly projecting annular bosses, or teeth, 36. The outer diameter of boss 35 is greater than the minimum diameter of the frustoconical surface portion 18 of bore surface 16.

Each radially inwardly projecting boss 36 is defined by an inner sharp edge 37 adapted to bite into the outer surface of the tube end in the made-up arrangement of the fitting, as illustrated in FIG. 5. Alternatively, the inwardly projecting tooth means may be formed as a helical thread.

The collet is further provided with at least one, and in the illustrated embodiment, a plurality of longitudinally extending slots 38. In the illustrated embodiment, the slots are equiangularly circumferentially spaced about the axis 39 of the collet and extend at least approximately 80% of the length of the collet. The circumferential extent of the slots is preselected so that when the inner end of the collet is constricted so as to close the slots at their inner ends 40, as illustrated in FIG. 4, the outer diameter of the boss 35 remains larger than the minimum diameter of the frustoconical surface 18. Thus, the collet is effectively positively prevented from being withdrawn from the body end 15 upon completion of assembly of the fitting, as illustrated in FIG. 4. Such constriction of the collet inner end may be effected by pressure forces acting within the fitting tending to urge the collet and tube end axially outwardly so as to urge the collet outer boss 36 forcibly against the frustoconical portion 18 of the body surface 16, as illustrated in FIG. 5. When fluid pressure is present within the fitting, the O-ring 13 would tend to be urged against the collet end 34 so as to effect the seal between the tube end and body, as discussed above.

As further illustrated in FIG. 5, the urging of the collet end portion 35 against the frustoconical surface 18 tends to constrict the slotted end of the collet so as to urge the sharp-edged inner bosses 36 radially into the surface of the tube end, thereby assisting in the positive retention of the tube end in the made-up connection of the tube end of the fitting.

As indicated briefly above, the body end 21 is caused to have a rigidity greater than the rigidity of the collet material so as to effectively positively retain the collet in the body end when assembled, as seen in FIGS. 1, 4, and 5. In the illustrated embodiment, both the body and collet are formed of metal and provide high strength positive retention of the tube end in sealed connection to the fitting, as discussed above.

By virtue of the relatively large radial configuration of the collet end 33, fingertip manipulation of the collet may be readily effected, avoiding the need for the use of screwdrivers and the like, as required in the fittings of the prior art.

Tube fitting 10 is extremely simple and economical of manufacture, and utilizes only three parts in effecting the high strength, improved positive sealing of the tube end to the fitting. The fitting is adapted to resist blowout against relatively high pressures, and as discussed above, provides for facilitated tubing release by fingertip engagement with the exposed relatively large end 33 of the collet.

Figure 7:
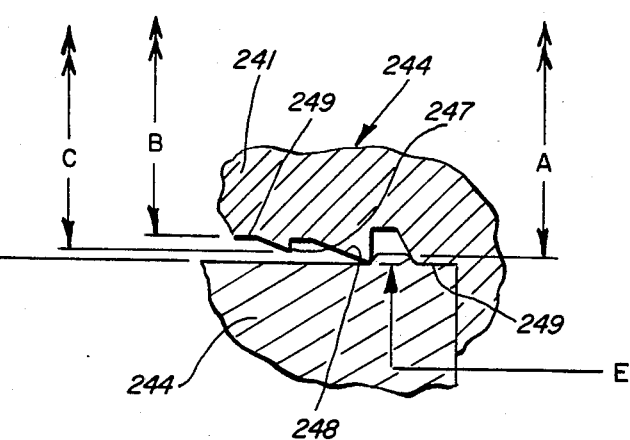
FIG. 7 is a fragmentary enlarged diametric section of a portion of the fitting of FIG. 6.

Referring now to the embodiment of FIGS. 6 and 7, a modified form of tube fitting generally designated 210 embodying the invention is shown to comprise a fitting adapted to connect a tube end T to an element 241 defining a port 242. Tube fitting 210 is generally similar to fitting 10 but includes a body 243 adapted to be connected to element 241 in the axially outer end of the port 242, as illustrated in FIG. 6.

Thus, body 243 defines a through axial bore 216 having an axially outer end 223 defining the axially outer end 217 of the bore. The bore outer end includes an axially outer, first cylindrical portion 217 and an axially inwardly widening frustoconical, inner portion 218.

The body bore further defines a radially enlarged intermediate cylindrical portion 219, within which is received an O-ring seal 213.

A collet 212 is received in the axially outer portion of the body, as illustrated in FIG. 6, in the same manner as is the collet 12 in the body portion 15 of fitting 10.

More specifically, collet 212 is defined by a tubular midportion 232, an axially outer, radially enlarged end 233, and an axially inwardly radially inwardly and outwardly enlarged end 234. The inner diameter of portions 232 and 233 is substantially equal to the outer diameter of the tube T, as shown in FIG. 6.

Inner end 234 of the collet is defined by a radially outwardly projecting boss 235 and a radially inwardly projecting boss 236. The outer diameter of boss 235 is greater than the minimum diameter of the frustoconical surface portion 218 of the body bore.

Radially inwardly projecting boss 236 is defined by an inner sharp edge 237 adapted to bite into the outer surface of the tube end in the made-up arrangement of the fitting, as illustrated in FIG. 6.

The collet is further provided with at least one, and in the illustrated embodiment, a plurality of longitudinally extending slots similar to slots 38 of fitting 10. As in fitting 10, the circumferential extent of the slots is preselected so that when the inner end of the collet is constricted so as to close the slots at their inner ends, the outer diameter of the boss 235 remains larger than the minimum diameter of the frustoconical surface 218. Thus, the collet is effectively positively prevented from being withdrawn from the body end 215 upon completion of assembly of the fitting. Such constriction of the collet inner end may be effected by pressure forces acting within the fitting tending to urge the collet and tube end axially outwardly so as to urge the collet outer boss 235 forcibly against the frustoconical portion 218 of the body surface 216. When fluid pressure is present within the fitting, the O-ring 213 tends to be urged against the collet end 234 so as to effect the seal between the tube end and body, as discussed above.

Fitting 210 differs from fitting 10 in that the axially inner portion 244 thereof is adapted to be received in the port 242, as discussed above. More specifically, as seen in FIGS. 6 and 7, body inner end portion 244 has an outer diameter substantially equal to the diameter of the port 242 and is provided with a radially outwardly opening annular recess 245, in which is received a conventional sealing O-ring 246 for sealing the body to the port element 241 when the body end 244 is installed in the port 242.

Axially outwardly of the recess 245, the body is provided with a first, radially enlarged tooth 247 having an outer diameter preselected to have a first interference fit with the element 241 in the port. In the illustrated embodiment, the tooth has a diameter approximately 0.001" to 0.004" greater than the diameter of the port 242 so as to have a moderate interference fit with the port element.

Body end 244 further defines a second annular tooth 248 axially inwardly of tooth 247 and having a diameter approximately 0.002 to 0.008" greater than the diameter of tooth 247 so as to have a moderate interference fit with the port element 241 following the passage of the first tooth 247 thereinto in installing the body in the made-up arrangement of the fitting, as seen in FIG. 6.

At its axially outer end, the body inner portion 244 is defined by a cylindrical outer surface 249 having a diameter substantially equal to the diameter of the second tooth 248 so as to have a friction fit with the port element through which the second tooth 248 has passed in arriving at the installed arrangement of FIG. 6.

Thus, the fitting 210 provides a permanent connection with port elements formed of metal or rigid plastics and the like, which is economical to manufacture, provides for facilitated installation, and provides a strong leakproof connection of the tube end to the port element.

The invention permits the port 242 to be machined within the customary diametrical tolerances for O-ring static seals. As the inner end portion 244 of the body is pressed into the port 242, the diametrical interference between the tooth 247 and the port element causes a radially inward deformation of the tooth and a radially outward deformation of the port at the point of contact. This results in a sizing action on both parts and, as the deformation is at least in part elastic, some of the material of the port element axially outwardly of the inserted tooth springs back to extend radially inwardly of the tip of the tooth creating a first locking action.

Further insertion of the body end portion 244 into the port brings the second tooth 248 into contact with the axially outer portion of the bore which has now been extended by the passage therethrough of first tooth 247. The second tooth, being slightly larger, comes into contact with the element in the enlarged bore portion. As the first tooth provides an accurately controlled diameter in the bore outer end, the second tooth has improved accurate relationship with the element in the bore so as to provide an improved positive retention of the body against axial displacement outwardly from the bore.

The second tooth further enlarges the port element and a portion thereof axially outwardly of the second tooth springs back so as to provide a further locking action effectively positively retaining the body end portion 244 in the bore.

The double-sizing action of the teeth results in a highly controlled bore diameter so that the cylindrical portion 249 of the outer surface of the body portion 242 is pressed into the outer end of the port with a controlled moderate force creating an additional frictional holding force on the body in the port.

As will be obvious to those skilled in the art, the cylindrical portion 249 may be provided with knurling or the like to further improve the grip with the port element.

By means of the improved successively larger gripping teeth, a multiple gripping action is provided in a right-circularly cylindrical port without the need for extremely precise dimensional control of the port.

Figure 8:
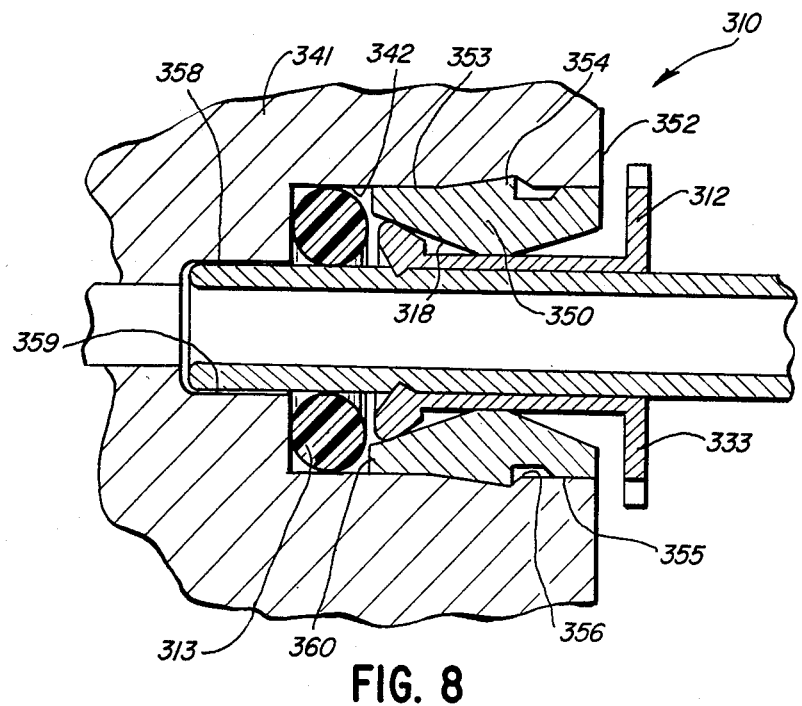
FIG. 8 is a diametric section illustrating the made-up arrangement of a further modified form of fitting embodying the invention.
Figure 9:
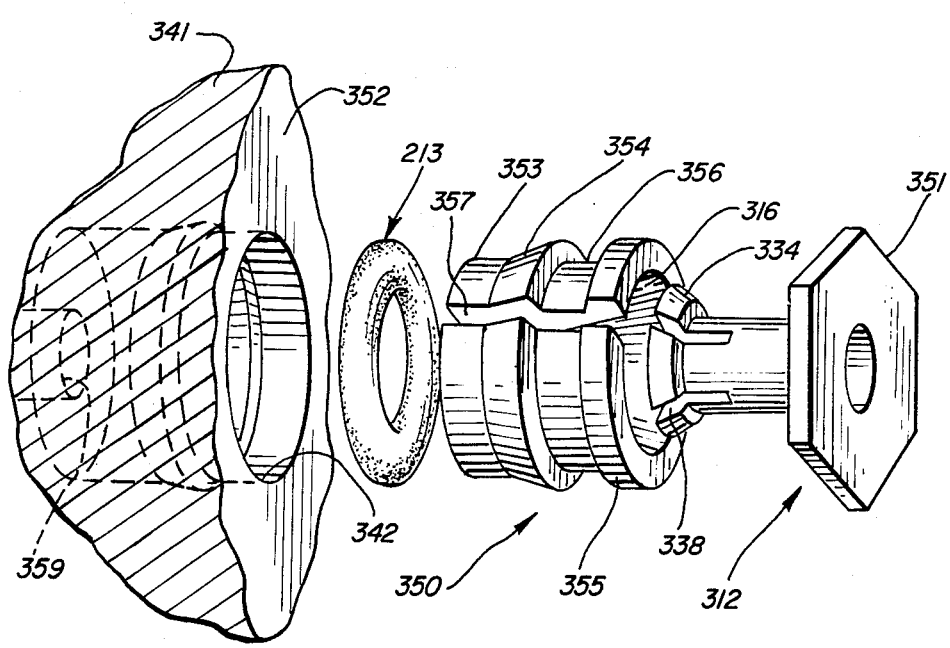
FIG. 9 is a fragmentary exploded perspective view of the fitting structure of FIG. 8.

Turning now to the embodiment of FIGS. 8 and 9, a modified form of tube fitting generally designated 310 embodying the invention is shown to comprise a tube fitting generally similar to tube fitting 210, but wherein a bushing 350 is provided in the port 342 of the port element 341 in lieu of the body 211 of fitting 210.

Fitting 310 includes a collet 312 generally similar to collet 212 of fitting 210, but having a radially enlarged outer flange 333 which, as illustrated in FIG. 9, may have a hexagonal periphery 351. The flange is preselected to have a maximum transverse extent greater than the diameter of the port 342 so as to define means for limiting the inward movement of the collet into the port by abutment of the peripheral portion of the flange 312 with the axially outer surface 352 of the port element. Collet 312 is utilized to urge the bushing 350 into the fully inserted disposition within port 342, as illustrated in FIG. 8, and the limitation of the movement of the collet 312 to the outer surface 352 of the port element correspondingly limits the insertion of the bushing 350 to a position wherein the outer end thereof is flush with the surface 352, as shown in FIG. 8.

Bushing 350 cooperates with collet 312 in the same manner as the constricted configuration of body 243 relative to the collet 212. Thus, more specifically, the enlarged inner end 334 of the collet cooperates with the frustoconical axially inwardly narrowing surface 318 of the bushing in the same manner as the enlarged end 235 of fitting 210 cooperates with the frustoconical surface 218 of the body 211.

The radially outer surface of the tubular bushing is defined by an axially innermost cylindrical portion 353, an intermediate, radially enlarged annular tooth 354, and a cylindrical outer portion 355. Axially outwardly of the annular tooth 354 the bushing is provided with an annular recess 356. As further shown in FIG. 9, the bushing is provided with a longitudinal slit 357 and the collet is provided with a plurality of longitudinal slits 338 corresponding to slits 38 of fitting 10.

An elastomeric sealing O-ring 313 is provided in the port axially inwardly of the inner end of the bushing and collet, as illustrated in FIG. 8, and the distal end 358 of the tube T is received in a reduced diameter, axially inner portion 359 of the port 342, with the O-ring sealing the distal end of the tube to the port element 341 in the made-up arrangement of the fitting, as illustrated in FIG. 8.

To assemble fitting 310, the O-ring 313 is first placed in the port. The collet 312 is then snapped into assembly into the bore 316 of the bushing. Slot 357 of the bushing permits sufficient radial expansion of the bushing to allow the collet inner end 334 to pass into engagement with the frustoconical surface 318. As in fitting 10, the slot 357 is of a preselected width so that, upon insertion of the bushing in the port, the bushing is constricted so as to completely close the slot.

The coaxially assembled bushing and collet are aligned coaxially with the port and pressure is applied to the outer surface of the flange 312 as by a flat-faced punch to urge the bushing and collet inwardly until the flange engages the outer surface 352 of the port element, whereupon the bushing will be disposed in the fully inserted arrangement of FIG. 8.

The diameter of the bushing end portion 353 in the installed disposition is preselected to provide a close fit with the port. The distal inner end of the bushing may be provided with a radially outer chamfer 360 to facilitate insertion of the bushing into the port. As will be obvious to those skilled in the art, the outer end of the port may be additionally or alternatively chamfered to facilitate such insertion.

As can be seen in FIG. 8, the annular tooth 354 effectively locks the bushing in the fully installed disposition by preventing axial displacement outwardly therefrom. The collet is similarly prevented from being displaced outwardly by the closing of the slots 338 as the enlarged end portion 334 is urged axially outwardly from the position of FIG. 8, thereby maintaining the collet in the installed disposition similarly as is collet 12 of fitting 10.

Fitting 310 comprises an extremely compact tube fitting which is not only economical of manufacture, space and material, but provides for facilitated installation and requires no precision tools in effecting the proper assembly thereof in the element port.

Turning now to the embodiment of FIGS. 10 and 11, a fitting generally designated 410 is shown to comprise a fitting generally similar to fitting 10, but further including a tubular eyelet 460 which is received in the through bore 414 of the fitting body 411 so as to be fitted within the tube end T when the tube end is inserted into the fitting in the made-up arrangement thereof, as illustrated in FIG. 11.

The tubular eyelet provides radially inward support of the tube end, thereby providing improved tensile strength in the fitting and is advantageously adapted for use where the tube end is formed of a synthetic resin or is subjected to elevated temperatures tending to soften the tube end.

By providing a radially inward support of the tube adjacent the biting teeth 437, an improved positive retention of the tube end in the fitting is provided over a wide range of pressures and environmental conditions.

As seen in FIG. 10, the tubular eyelet has a loose, or slipfit in the innermost recess 430 of the body bore. The axial length of the eyelet is preseslected so that the outer end 461 thereof projects outwardly from the fitting thereby facilitating placement of the tube end thereabout in effecting the desired connection.

As illustrated in FIG. 10, the eyelet may be moved axially into the body bore 414 subsequent to the swaging of the body portion 421 to the frustoconical configuration, with the collet 412 loosely received therein. The eyelet defines a radially enlarged inner end 462 defining an annular flange having an outer diameter slightly larger than the inner diameter of the biting teeth 437. As a result of the provision of the slots 438 in the collet, the inner tooth portion of the collet radially expands to permit the flange 462 to pass freely therethrough to the fully inserted disposition of FIG. 10.

As the diameter of the flange 462 is greater than the inner diameter of the teeth 437, the eyelet is retained within the fitting so that it cannot separate therefrom and be lost. At the same time, the eyelet is transaxially loosely received in the fitting so as to accommodate the installed tube end which acts to center the eyelet in the collet in the made-up arrangement of the fitting, as seen in FIG. 11.

As further illustrated in FIG. 10, the axially outer, radially outturned flange 433 of the collet has an outer diameter slightly less than the outer diameter of the axially outer end of the body, assuring that the collet end will not interfere with the swaging tool 20 during the forming of the body portion 421.

Further, by maintaining the outer diameter of the flange 433 smaller than the outer diameter of the adjacent end of the body portion 421, inadvertent release of the tube from the fitting is effectively prevented.

Where a plurality of annular teeth, or a helical tooth is provided on the inner end of the collet, it is desirable to have the axial extent of the slots 438 be at least approximately 80% of the axial length of the collet. Where a single tooth is utilized, such as in fittings 210 and 310, the slots may be somewhat shorter.

In all other respects, the structure and functioning of fitting 410 is similar to that of fitting 10, and similar elements of fitting 410 are identified with similar reference numerals, but 400 higher.

As the eyelet may be installed subsequent to the forming of the body to the configuration of FIG. 10, the use of the eyelet may be selectively determined by the user. The provision of the eyelet provides for substantially improved holding power in combination with the plural or helical thread gripping means.

The foregoing disclosure of specific embodiments is illustrative of the broad inventive concepts comprehended by the invention.

We claim:

1. A releasable tube fitting comprising:
a body provided with a through bore, said body having an axially outer portion, said bore defining a cylindrical inner surface at the axially outer end of said bore opening through said body outer portion, and a radial stop surface at the axially inner end of said axially outer portion of the bore;
a split resilient tubular bushing in said axially outer end of the bore resiliently biased against said cylindrical surface, an axially inner end portion
of the bushing defining a radially inner axially inwardly widening frustoconical wedging surface; and
an annular collet for coaxially receiving the end of a tube for connection to said body, said collet defining an axis and being coaxially received in said bushing and having a tubular midportion, an axially outer radially outwardly turned portion axially outwardly of said body outer portion and having an outer diameter greater than the inner diameter of said bushing at the axially outer end thereof for ease of tube release, an axially inner end permitting constriction of said collet inner end radially inwardly of said frustoconical wedging surface of the bushing and having a radially outwardly projecting camming portion, and a radially inwardly directed sharp tube gripping portion, said collet further having at least one longitudinally extending slot at said axially inner end as an incident of the collet being urged axially outwardly with said camming portion engaging said frustoconical wedging surface, the total slot width circumferentially of the collet axis being preselected to cause the minimum outer diameter of said camming portion when said inner end of the collet is fully radially constricted to be greater than the diameter of the axially outer end of said frustoconical wedging surface.

2. The tube fitting of claim 1 wherein an annular seal is coaxially disposed in said bore axially outwardly of said stop surface and axially inwardly of said collet inner end and inner end portion of the bushing defining means for sealing a tube end extended axially inwardly from the collet through the seal.

3. The tube fitting of claim 1 wherein said bushing is provided with means for biting into said cylindrical body bore surface as a result of the resilient biasing of said bushing.

4. The tube fitting of claim 1 wherein said body outer end is defined by a material selected to be deformed beyond its elastic limit by said wedging surface of the bushing.

5. The tube fitting of claim 1 wherein said fitting further includes means for sealing the tube end to the body axially outwardly of said stop surface of the body 6. The tube fitting of claim wherein said collet defines means for urging the bushing into the body bore to be flush with the axially outer end of the body bore.

7. The tube fitting of claim 1 wherein said bushing further defines an axially outer radially inner axially inwardly narrowing frustoconical wedging surface.

8. The tube fitting of claim 1 wherein said bushing includes means for permitting free axial movement of the bushing into said bore and effectively preventing axial displacement outwardly therefrom.

9. The tube fitting of claim 1 wherein said axially inner frustoconical portion widens axially inwardly at an included angle in the range of approximately 20°–24°.

10. The tube fitting of claim 1 wherein said tube gripping portion comprises a helical tooth.

11. A tube fitting comprising:
a tubular body defining a through axial bore, said body having an axially outer end defining a radially inner surface defining the axially outer end of said bore and including an axially outer first cylindrical portion, and an axially inwardly widening frustoconical axially inner portion, said body further defining an axially inner end;
means on radially outer surface of said body axially inner end for sealingly securing said body to an element defining a cylindrical port adapted to receive said body inner end comprising a first, axially inner, annular tooth having an outer diameter preselected to have a first interference fit with the element in the port thereof, and a second, axial outer annular tooth having an outer diameter larger than the outer diameter of said first tooth and being preselected to have a second interference fit with the element in the port thereof; and
an annular collet for coaxially receiving the end of a tube for connection to said body in said bore, said collet defining an axis and being coaxially received in said bore outer end and having a tubular midport, an axially outer radially outwardly turned flange axially outwardly of said body outer end and having an outer diameter no greater then the minimum outer diameter of said body outer end, an axially inner end radially inwardly of said frustoconical inner portion of the bore outer end and having a radially outwardly projecting camming portion, and a radially inwardly directed tube gripping portion, said collet further having at least one longitudinally extending slot at said axially inner end permitting constriction of said collet inner end as an incident of the collet being urged axially outwardly with said camming portion engaging said frustoconical bore surface portion, the total slot width circumferentially of the collet axis being preselected to cause the minimum outer diameter of said camming portion when said inner end of the collet is fully radially constricted to be greater than the diameter of the outer end of said frustoconical bore surface portion.

12. The tube fitting of claim 11, wherein said means for sealingly securing said body to the port element further includes a cylindrical portion axially outwardly of said second tooth and having a diameter substantially equal to the diameter of said second tooth to have a frictional fit with said element in the port thereof axially outwardly of said second tooth.

13. A releasable tube fitting comprising:

a body provided with a through bore, said body having an axially outer portion, said bore defining a cylindrical inner surface at the axially outer end of said bore opening through said body outer portion, and a radial stop surface at the axially inner end of said axially outer portion of the bore;

a split resilient tubular bushing in said axially outer end of the bore resiliently biased against said cylindrical surface, an axially inner end portion of the bushing defining a radially inner axially inwardly widening frustoconical wedging surface;

an annular collet for coaxially receving the end of a tube for connection to said body, said collet defining an axis and being coaxially received in said bushing and having a tubular midportion, an axially outer radially outwardly turned portion axially outwardly of said body outer portion and having an outer diameter greater than the inner diameter of said bushing at the axially outer end thereof, an axially inner end radially inwardly of said frustoconical wedging surface of the bushing and having a radially outwardly projecting camming portion, and a radially inwardly directed sharp tube gripping portion, said collet further having at least one longitudinally extending slot at said axially inner end permitting constriction of said collet inner end as an incident of the collet being urged axially outwardly with said camming portion engaging said frustoconical wedging surface, the total slot width circumferentially of the collet axis being preselected to cause the minimum outer diameter of said camming portion when said inner end of the collet is fully radially constricted to be greater than the diameter of the axially outer end of said frustoconical wedging surface; and a tubular eyelet receiving coaxially in said bore adapted to be disposed within a tube end inserted coaxially inwardly through said collet for connection to said fitting.

14. The tube fitting of claim 13 wherein said eyelet includes an inner, radially enlarged annular end having an outer diameter greater than the inner diameter of said tube gripping portion.

15. The tube fitting of claim 13 wherein said eyelet defines an outer end and has a length preselected to dispose said outer end outwardly of said body bore when the eyelet is fully installed therein.

16. The tube fitting of claim 13 wherein said collet outer flange has an outer diameter less than the outer diameter of said body axially outer end.

17. The tube fitting of claim 13 wherein said slot has an axial length at least approximately 80% of the axial length of said collet.

* * * * *